Dec. 2, 1958 J. R. WALD, JR., ET AL 2,862,399
PREFABRICATED GEAR ASSEMBLY
Filed Jan. 31, 1955 3 Sheets-Sheet 1

INVENTORS
JOHN R. WALD, JR.
RUFUS W. WILSON

BY Karl W. Flocks
ATTORNEY

Dec. 2, 1958     J. R. WALD, JR., ET AL     2,862,399
PREFABRICATED GEAR ASSEMBLY
Filed Jan. 31, 1955     3 Sheets-Sheet 2

INVENTORS
JOHN R. WALD, JR.
RUFUS W. WILSON

BY Karl W. Flocks
ATTORNEY

United States Patent Office 2,862,399
Patented Dec. 2, 1958

2,862,399

PREFABRICATED GEAR ASSEMBLY

John R. Wald, Jr., Montoursville, and Rufus W. Wilson, Huntingdon, Pa., assignors to Wald Industries, Inc., Huntington, Pa., a corporation of Pennsylvania Application January 31, 1955, Serial No. 485,098

4 Claims. (Cl. 74—448)

The present invention relates to a prefabricated gear assembly. More particularly, the present invention relates to a gear assembly which is formed of prefabricated elements or components, the elements being secured in the assembly in such a manner so as to enable the gear teeth to be quickly and easily removed or replaced as desired.

Prior to the instant invention, gears, and particularly sprocket gears, have been stamped, forged, molded or machined as a complete and integral unit. Therefore, if a different pitch diameter gear or sprocket is required in the apparatus or drive being utilized, the sprocket or gear must be replaced with an entirely new gear or sprocket unit having the desired pitch diameter. Moreover, if an individual gear tooth or sprocket tooth is damaged during the operation of the device, it is again necessary to replace the entire gear or sprocket unit. Furthermore, it has been found that in designing a drive unit which employs sprockets or gears, the diameter of the sprockets or gears used may not be immediately ascertained and, therefore, the correct pitch diameter of the gear or sprocket will be obtained only after the final assembly of the drive unit is made. However, in such instances, it may be that the sprocket or gear desired is not available and, therefore, considerable time must be expended in machining or fabricating a new sprocket or gear to suit the requirements of the drive assembly.

It is therefore an object of the present invention to provide a prefabricated gear assembly that includes a plurality of preformed elements that are preassembled to meet the desired drive assembly requirements.

Another object of the present invention is to provide a prefabricated gear assembly wherein the pitch diameter of the assembly may be varied as desired by utilizing preformed discs and hubs.

Still another object of the present invention is to provide a prefabricated gear assembly wherein preformed gear teeth are adapted to be secured to the gear assembly hubs and discs, the gear teeth being removable as desired.

Still another object of the present invention is to provide a prefabricated gear assembly wherein removable teeth are included in the assembly and are adapted to be secured therein by novel securing means.

Still another object of the present invention is to provide a prefabricated gear assembly which includes a plurality of interchangeable elements.

Other objects and the nature and advantages of the instant invention will be apparent from the following description taken in conjunction with the accompanying drawings, wherein.

The instant invention is designed to overcome the problems involved when individual gear teeth are damaged during operation of the gear or if a gear having a different pitch diameter is needed in the drive unit. Since the entire gear wheel must be replaced if a single or several gear teeth are damaged, it is unduly time-consuming and relatively expensive to replace the entire gear with a new gear inasmuch as the new gear may not be on hand and either must be ordered or machined. It is seen, therefore, that it is desirable to utilize a system wherein individual gear teeth may be replaced, as desired, if they become damaged during operation of the drive unit. It is furthermore seen that it is desirable to be able to modify the pitch diameter of the gear by interchanging stock pieces that are on hand.

Figure 1:
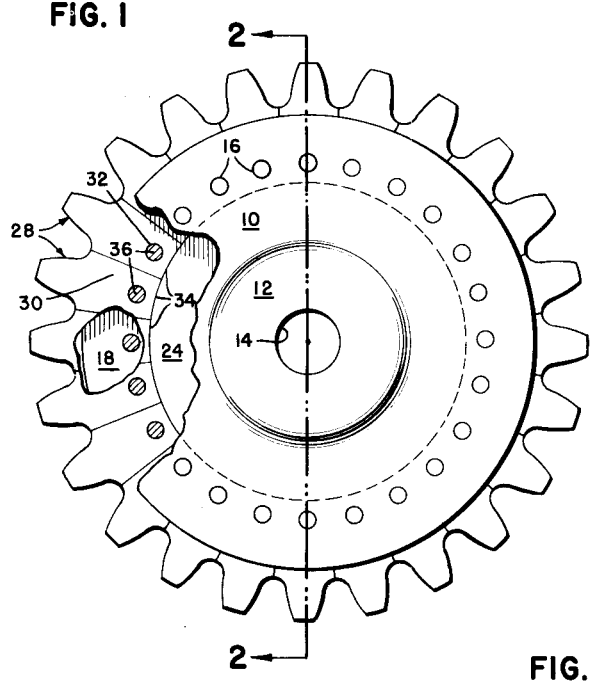
Fig. 1 is a side elevational view of one form of the prefabricated gear assembly described in the present invention with a portion thereof broken away to illustrate the detachable teeth which are formed as part of the assembly.
Figure 2:
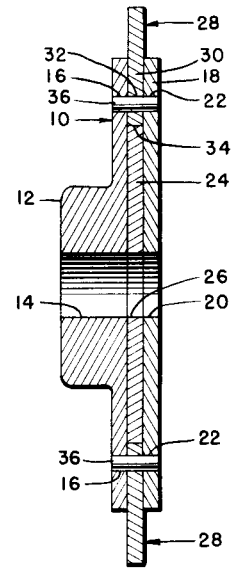
Fig. 2 is a vertical sectional view taken along the line 2—2 of Fig. 1.
Figure 3:
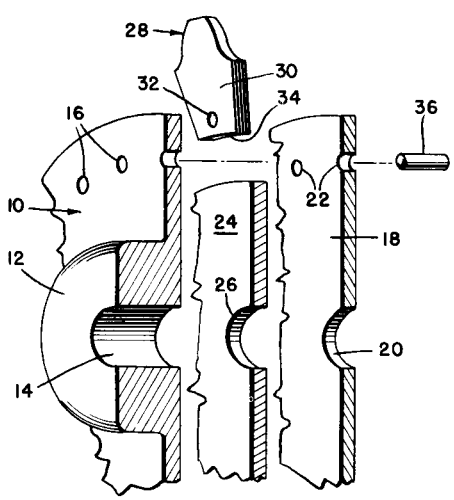
Fig. 3 is an exploded partial perspective view in section illustrating the prefabricated gear assembly shown in Figs. 1 and 2.

Referring now to Figs. 1–3 of the drawings, one form of the prefabricated gear assembly is illustrated and comprises a disc 10 which includes a central hub 12 having a bore 14 formed therein. The disc 10 also includes a plurality of openings or holes 16 which are formed therein adjacent the outer edge thereof and which are adapted to receive a pin for securing the disc 10 in the gear assembly, as will be described hereinafter. A disc 18 is adapted to be secured to the disc 14 and defines therewith the outer faces of the gear assembly. The disc 18 is formed with the same diameter as the disc 14 and has a central bore 20 therein which is adapted to communicate with the bore 14 of the hub 12. A plurality of openings 22 are formed in the disc 18 and correspond in position to the openings 16 formed in the disc 14. Interposed between the disc 14 and disc 18 and secured therebetween is an inner disc 24 which has a bore 26 formed therein communicating with the bores 14 and 20 which thereby form a continuous bore extending from the hub 12 through the disc 18. The inner disc 24 is formed of a smaller diameter than the discs 14 and 18 and an annular slot is thereby formed between the disc 14 and disc 18, the depth of which is defined by the diameter of the inner disc 24. In order to complete the gear assembly, a plurality of detachable gear teeth 28 are adapted to be fitted within the annular slot formed between the discs 14 and 18. Each of the gear teeth 28 is formed with a shank portion 30 which has an opening or hole 32 formed therein adjacent a lower edge 34, the lower edge 34 defining an arc corresponding to that portion of the disc 24 which it engages. The upper portion of the individual gear teeth 28 defines a toothed section that is adapted to receive a sprocket chain or mesh with an adjacent gear wheel and, as described above, the shank portion 30 extends into the slot defined by the discs 10, 18 and inner disc 24. In order to firmly secure the gear teeth 28 in the annular slot, pins 36 extend through the openings 16 formed in the disc 10, through the openings 32 formed in the shank portion 30 of the gear teeth 28, and through the openings 22 formed in the disc 18. The pins 36 may be force-fitted into the openings 16, 22 and 32 to assemble the gear elements, or a bolt and nut may be employed to effect the assembly. It is seen that the gear teeth 28 may be formed in one standard size and thus may be employed for any gear wheel to be used regardless of the pitch diameter. However, in order to vary the pitch diameter of the gear wheel, it is only necessary to interchange the disc 10 and the discs 18 and 24 with suitably sized elements. By utilizing the teaching of the present invention, a complete range of gears or sprockets may be available, it only being necessary to stock various diameter discs 10, 18 and 24. It is seen that the discs to be utilized for a specific drive unit may easily be assembled with the gear teeth 28 to complete the gear assembly. It is also apparent that the desired gear may be assembled in a relatively short period of time and the assembled gear will be exactly the size desired for the operation to be performed. During operation of the drive unit, if one of the teeth 28 is broken or damaged, it may be removed by simply knocking out the pin 36 from the openinngs 16, 22 and 32. A new gear tooth may then be inserted into the annular slot from which the damaged tooth had been removed and the pin 36 replaced. It is apparent that this method of replacing a damaged individual gear tooth prevents tearing down the entire drive assembly to replace the gear wheel and thus decreases maintenance costs and increases the operating time of the drive unit.

Figure 4:
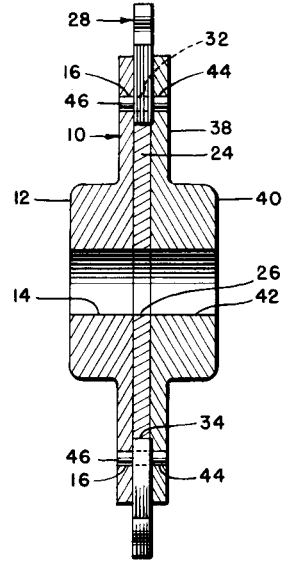
Fig. 4 is a vertical sectional view illustrating a modified form of the present invention wherein a dual hub arrangement is employed.

Referring now to Fig. 4, a modified form of the present invention is illustrated and is essentially the same as that described above in connection with Figs. 1–3. As shown in Fig. 4, the modified gear wheel includes the disc 10 which has integrally formed thereon the hub 12, the hub 12 having formed therein the central bore 14. The inner disc 24 is retained in the assembly in this modification and abuts against the face of the disc 10 as described above. The gear assembly shown in Fig. 4 further includes a disc 38 which is similar in construction to the disc 10 and has integrally formed thereon a hub 40 similar to the hub 12. The hub 40 also includes a central bore 42 formed therein which communicates with the bore 14 of the hub 12 and the bore 26 of the inner disc 24. The disc 38 further includes a plurality of openings 44 which are formed adjacent the outer edge thereof and which are adapted to receive pins 46, the pins 46 extending through the openings 16 formed in the disc 10, and the openings 32 formed in the gear teeth 28. It is seen that the gear is assembled by joining the discs 10 and 38 with the inner disc 24 interposed therebetween by inserting the pin 46 through the appropriate openings formed therein and in the gear teeth 18. As described above, if it is required to change the pitch diameter of the gear assembly, a new set of the outer discs and an inner disc of the desired size are interchanged for the discs 10 and 38 and inner disc 24, respectively. The teeth 28 are then locked in the new assembly. Damaged teeth 28 may, of course, be replaced as described above in connection with Figs. 1–3.

Figure 5:
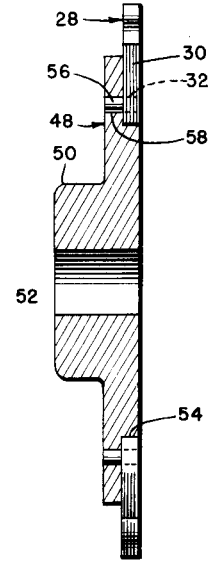
Fig. 5 is a vertical sectional view illustrating a further modified form of the present invention wherein a single hub is employed.

Referring now to Fig. 5, another modified form of the present invention is illustrated and comprises a disc 48 which includes a hub 50 having a central bore 52 formed therein. The disc 48 is somewhat thicker in cross section than the discs described above and thus has an annular cut-out portion formed in one face thereof defining an annular shoulder 54. Since the width of the cut-out portion which defines the annular shoulder 54 is the same dimension as that of the width of the gear teeth 28, the outside surface of the teeth 28 defines a continuous surface with the face of the disc 48. It is seen that the gear teeth 28 are positioned around the annular shoulder 54 and are secured to the disc 48 by pins 56 that extend through openings 58 formed in the disc 48 and the openings 32 formed in the shank portion 30 of the teeth 28. In this modification, if the pitch diameter is to be changed, the entire disc 48 is replaced. However, it is understood that a damaged tooth may be replaced by simply removing the appropriate pin 56.

Figure 6:
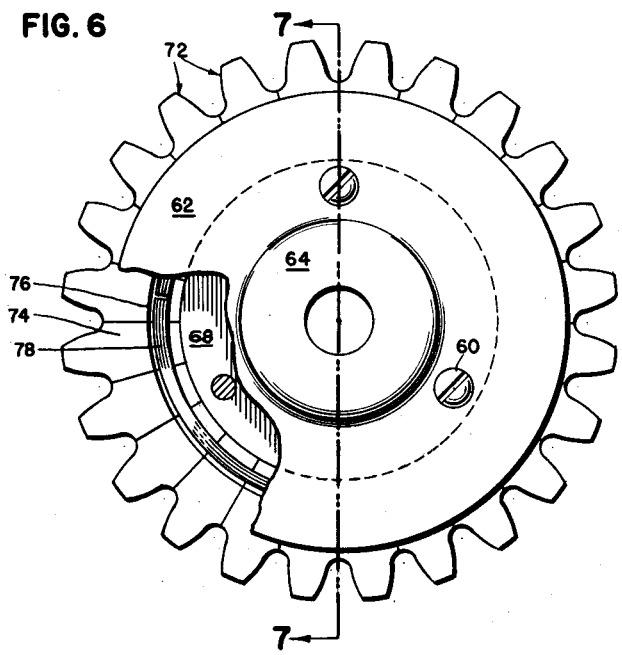
Fig. 6 is a side elevational view of a further modification of the present invention with a portion thereof broken away to illustrate a modified form of locking means for locking the gear teeth in the assembly.
Figure 7:
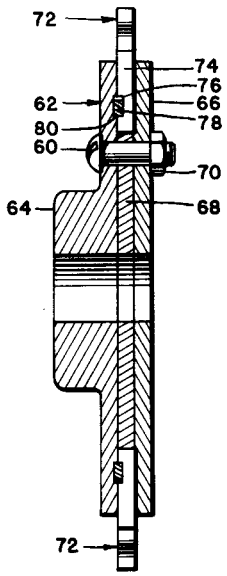
Fig. 7 is a vertical sectional view taken along the lines 7—7 of Fig. 6.
Figure 8:
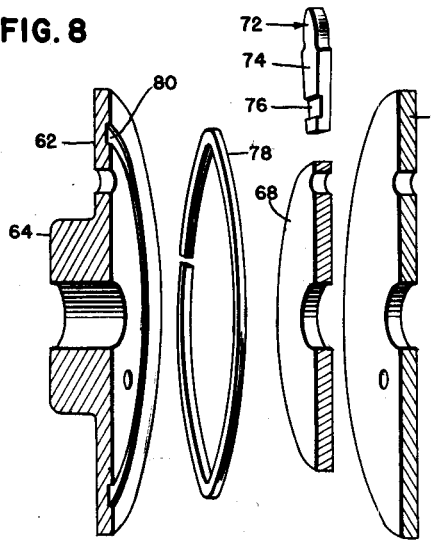
Fig. 8 is an exploded perspective view in section of the modified gear illustrated in Figs. 6 and 7.

Referring now to Figs. 6, 7 and 8, a further modified form of the present invention is illustrated and incorporates a snap or locking ring that is adapted to secure the gear teeth 28 in the gear assembly. The general construction of the gear assembly shown in Figs. 6–8 is similar to that of Figs. 1–3 with the exception that bolts 60 extend through appropriate openings formed in a disc 62 which includes a hub 64. The bolts 60 also extend through an outer disc 66 and an inner disc 68, the discs 62, 66, 68 being locked in the assembled position by nuts 70. A modified form of gear teeth 72 is illustrated in Figs. 6–8, each of the gear teeth 72 including a shank portion 74 that has a slot 76 formed therein. In order to lock the gear teeth 72 between the disc 62 and the disc 66, a lock or snap ring 78 is provided and is adapted to fit within the slot 76 formed in the gear teeth 72 and in a corresponding slot 80 formed in the disc 62. The lock ring 78 is shown being split; however, it is understood that a solid ring may be utilized, if desired. In the assembly of the gear assembly shown in Figs. 6–8, the gear teeth 72 are first locked to the disc 62 by the lock ring 78 and are then securely locked in position by placing the disc 66 in engagement with the disc 68 and the gear teeth 72. The rivet or bolts 60 are then inserted through the appropriate openings formed in the discs 62, 66 and 68 and locked therein by the nuts 70. Replacement of a single tooth 72 only requires removal of the outer disc 66 from engagement with the assembly. However, if a gear having a different pitch diameter is required, the disc 62, lock ring 78, inner disc 68 and disc 66 must be replaced. The teeth 72 may, of course, be utilized in the new assembly being interchangeable with any size gear.

Figure 9:
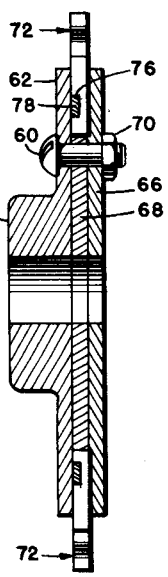
Figs. 9 and 10 are vertical sectional views illustrating further modified forms of the present invention and show in particular modifications for securing the gear teeth in the gear assembly.

Referring now to Fig. 9, a modified form of the invention illustrated in Figs. 6–8 is shown and is identical with that construction except that the ring receiving slot 80 formed in the disc 62 is eliminated. The lock ring 78 is received by the shank slots 76 of the teeth 72, and the discs 62, 66, 68 are secured together by the bolts 60 extending through appropriate openings therein, thereby locking the teeth in the assembly. It is seen that if a different pitch diameter gear is desired, it is only necessary to interchange the inner disc 68 and lock ring 78 with the desired disc and ring. As described hereinbelow, the inner disc 68 may be retained in the assembly without change as the pitch diameter of the gear varies if an inner disc corresponding in diameter to the new pitch diameter is not available.

Figure 10:
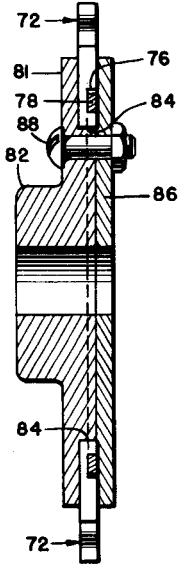

Referring now to Fig. 10, a further modified form of the lock ring structure 78 illustrated in Figs. 6–8 is shown. In Fig. 10, the central or inner disc 68 is eliminated and a disc 81 having a central hub 82 is utilized, the disc 81 being formed with a somewhat thicker cross sectional dimension than that shown in Figs. 6–8. The disc 81 has an annular cut-out portion formed therein which defines an annular shoulder 84. The annular shoulder 84 receives the gear teeth 72 therein and the lock ring 78 is positioned in the slots 76 formed in the gear teeth 72 to lock the teeth in position on the annular shoulder 84. In order to positively secure the teeth 72 in the gear assembly, a disc 86 engages the face of the gear teeth 72 and the disc 81 in abutting relation therewith and is secured thereto by rivets or bolts 88 which extend through appropriate openings formed in the disc 81 and disc 86.

Figure 11:
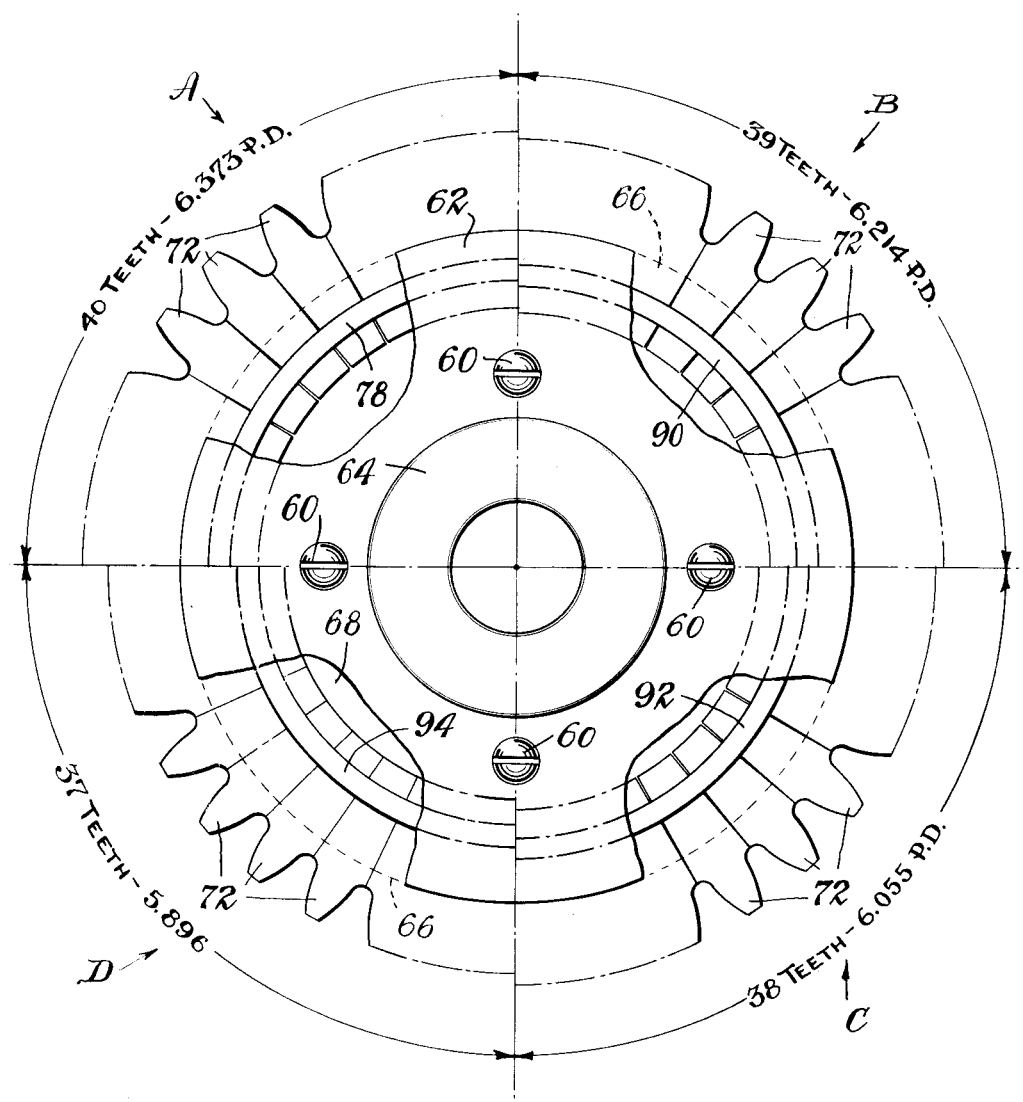
Fig. 11 is a diagrammatic illustration of the application of the present invention showing four quadrants, each quadrant having a different pitch circle.

Referring now to Fig. 11, the application of the present invention is illustrated diagrammatically, four separate and distinct sprocket wheels being indicated in quadrants A, B, C and D. Fig. 11 shows the use of the various gear elements as the pitch diameter of the sprocket wheel is varied. For example, in quadrant A, a sprocket wheel which is similar to that shown in Fig. 9 includes a disc 62 that is secured by bolts 60 to an inner disc, such as disc 68, and to an outer disc, such as disc 66. Gear teeth 72 are secured in the assembly by a lock ring 78 that is of a diameter that is calculated to establish a pitch diameter of 6.373. With the pitch diameter so predetermined, the sprocket wheel will include forty of the gear teeth 72. If it is desired to decrease the pitch diameter, thus decreasing the number of gear teeth 72 employed in the sprocket gear, a smaller diameter lock ring is utilized, a lock ring 90, for example, shown in quadrant B being utilized. In quadrant B, thirty-nine of the gear teeth 72 are employed, resulting in a pitch diameter of 6.214. It is understood that the gear teeth 72 are identical in form to the gear teeth utilized in quadrant A. It is also understood that the outer discs 62, 66 are identical in form and construction to those employed in quadrant A. In quadrant C, thrity-eight of the teeth 72 make up the sprocket gear, resulting in a pitch diameter of 6.055. Since the pitch diameter in quadrant C is decreased, a lock ring 92 having a correspondingly smaller diameter than lock rings 78 and 90 must be utilized. The pitch diameter of the sprocket gear is further decreased in quadrant D, thereby requiring only thirty-seven of the gear teeth 72, resulting in a pitch diameter of 5.896. The associated lock ring 94 has a correspondingly smaller diameter but the outer discs 62 and 66 remain the same.

As clearly illustrated in Fig. 11, the present invention enables a gear of required size to be quickly fabricated whenever desired, the requirement for the change being only a different diameter lock ring. It is seen, however, that the diameter of the inner disc may be varied along with the lock ring as the pitch diameter changes, but this latter change is not essential in the construction of each sprocket gear provided that the diameter of the inner disc is the smallest diameter to be utilized for any single gear. In all variations of the sprocket gears illustrated, the size of the gear teeth always remain the same, thereby enabling the pitch diameter of the sprocket gear to be quickly altered or, if it is required, a broken gear tooth to be replaced.

It will be obvious to those skilled in the art that various changes may be made without departing from the spirit of the invention and therefore the invention is not limited to what is shown in the drawings and described in the specification but only as indicated in the appended claims.

What is claimed is:

1. In a prefabricated gear assembly, a first disc having a hub formed thereon, a second disc having an outer diameter corresponding to the outer diameter of said first disc, means for adjusting the pitch diameter of said gear assembly comprising disc means positioned between said first and second discs, said disc means being adapted to have an outer diameter less than that of said first and second discs, the composite structure of said first and second discs and said disc means defining an annular slot in the edge thereof, a plurality of detachable gear teeth of predetermined dimension arranged in said slot, the bottom of said gear teeth contacting the outer edge surface of said disc means, the outer diameter of said disc means thereby predetermining the pitch diameter of the composite gear assembly, and means associated with said discs for securing said discs, disc means and gear teeth in said gear assembly.

2. In a prefabricated gear assembly, a first disc having a hub formed thereon, said hub having a central bore formed therein, a second disc having an outer diameter corresponding to the outer diameter of said first disc, a third disc located between said first disc and said second disc and having an outer diameter less than that of said first and second discs, said three discs being secured together and forming in the composite structure an annular slot in the edge thereof, a plurality of detachable gear teeth of predetermined height arranged in said slot, the bottom of said gear teeth contacting the outer edge surface of said third disc, the outer diameter of said third disc predetermining the pitch diameter of the composite gear assembly, means extending through said three discs for securing said discs and gear teeth in said gear assembly.

3. In a prefabricated gear assembly a first outer disc having a central hub formed thereon and defining the hub of the gear assembly, a second outer disc of equal outer diameter as said first disc, an inner disc disposed between said outer discs and having an outer diameter less than that of said outer discs, an annular slot thereby being formed between said outer discs and inner disc, the inner disc defining the bottom of said slot and said outer discs defining the sides of said slot, a plurality of detachable gear teeth positioned in said slot, the bottom of said gear teeth contacting the outer edge surface of said inner disc, the diameter of said inner disc determining the pitch diameter of the gear assembly, each of said gear teeth having a groove formed in the shank portion thereof, a detachable split lock ring positioned in said grooves and locking said teeth in position in said slot, and bolts extending through said outer discs and through said inner disc for securing said gear assembly together, whereby said first outer disc is positioned in intimate contact with said inner disc, said lock ring and one face of said gear teeth, and said second outer disc is positioned in intimate contact with the inner disc and the other face of said gear teeth, said gear teeth thereby being securely retained in the assembled position.

4. In a prefabricated gear assembly as set forth in claim 3 wherein said first outer disc is formed with an annular groove for receiving the detachable lock ring therein, said lock ring thereby being firmly retained in the locking position.

References Cited in the file of this patent

UNITED STATES PATENTS

| | | |
|---|---|---|
| 480,930 | Lindsay | Aug. 16, 1892 |
| 826,129 | Troup | July 17, 1906 |
| 1,390,198 | Fossatti | Sept. 6, 1921 |